United States Patent
Blom et al.

(10) Patent No.: US 9,663,169 B2
(45) Date of Patent: May 30, 2017

(54) BICYCLE CHILD SEAT

(71) Applicant: Thule IP AB, Malmö (SE)

(72) Inventors: Carl-Johan Blom, Sundbyberg (SE); Anna Carell, Bromma (SE)

(73) Assignee: Thule IP AB, Malmö (SE)

( * ) Notice: Subject to any disclaimer, the term of this patent is extended or adjusted under 35 U.S.C. 154(b) by 0 days.

(21) Appl. No.: 14/889,123

(22) PCT Filed: May 5, 2014

(86) PCT No.: PCT/EP2014/059072
§ 371 (c)(1),
(2) Date: Nov. 4, 2015

(87) PCT Pub. No.: WO2014/180768
PCT Pub. Date: Nov. 13, 2014

(65) Prior Publication Data
US 2016/0075390 A1 Mar. 17, 2016

(30) Foreign Application Priority Data
May 8, 2013 (EP) .................................. 13166957

(51) Int. Cl.
*B62J 1/16* (2006.01)
*B62J 1/28* (2006.01)
(52) U.S. Cl.
CPC .. *B62J 1/16* (2013.01); *B62J 1/28* (2013.01)
(58) Field of Classification Search
CPC ..................................... B62J 1/16; B62J 1/28
See application file for complete search history.

(56) References Cited

U.S. PATENT DOCUMENTS

| | | | | |
|---|---|---|---|---|
| 4,030,648 A * | 6/1977 | Johnson | ..................... | B62J 7/04 224/415 |
| 5,542,587 A * | 8/1996 | Broz | ......................... | B62J 7/04 2/421 |
| 5,588,701 A * | 12/1996 | Chuang | ..................... | B62J 1/16 297/195.13 |
| 5,653,500 A * | 8/1997 | Amore | ..................... | B62J 11/00 280/202 |

(Continued)

FOREIGN PATENT DOCUMENTS

| | | |
|---|---|---|
| EP | 0 832 811 | 4/1998 |
| EP | 0 987 171 | 3/2000 |
| EP | 1 097 862 | 5/2001 |

OTHER PUBLICATIONS

International Search Report and Written Opinion of the International Searching Authority for International Appl. No. PCT/EP2014/059072, European Patent Office, Rijswijk, Netherlands, mailing date of Dec. 19, 2014, 8 pages.

(Continued)

*Primary Examiner* — Philip Gabler
(74) *Attorney, Agent, or Firm* — Sterne, Kessler, Goldstein & Fox P.L.L.C.

(57) ABSTRACT

A bicycle child seat adapted to be mounted to a bicycle. The bicycle child seat includes a seat module which is pivotally arranged to an attachment module so that the seat module can pivot between a rest position and an upraised position with respect to the attachment module. The seat module is configured to pivot along an arc portion with respect to the attachment module (30) in a rocking-chair manner.

21 Claims, 9 Drawing Sheets

(56) References Cited

U.S. PATENT DOCUMENTS

| | | | | |
|---|---|---|---|---|
| 5,850,958 A | * | 12/1998 | Belanger | B62J 1/16 224/415 |
| 5,890,759 A | * | 4/1999 | Ross | B62J 1/16 280/202 |
| 8,251,388 B2 | * | 8/2012 | Sauceda | B62J 1/16 224/415 |

OTHER PUBLICATIONS

European Search Report for European Application No. EP 13166957.4, European Patent Office, Munich, Germany, dated Jul. 4, 2013, 5 pages.

* cited by examiner

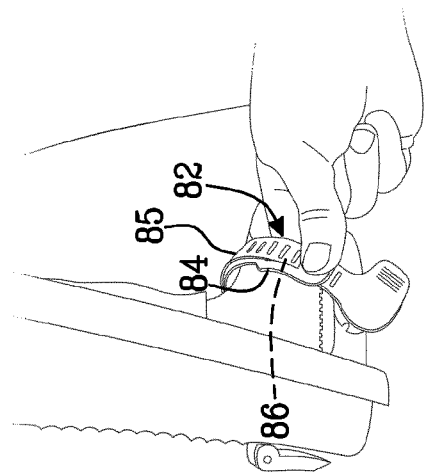
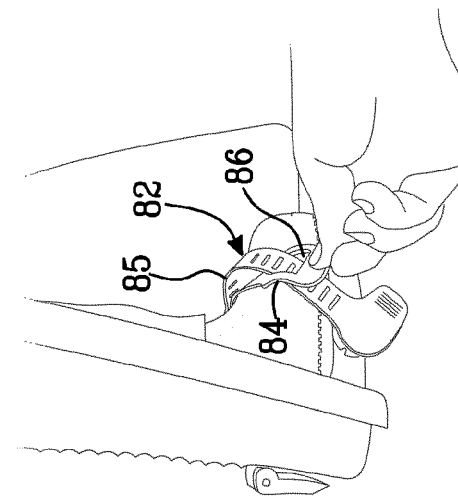
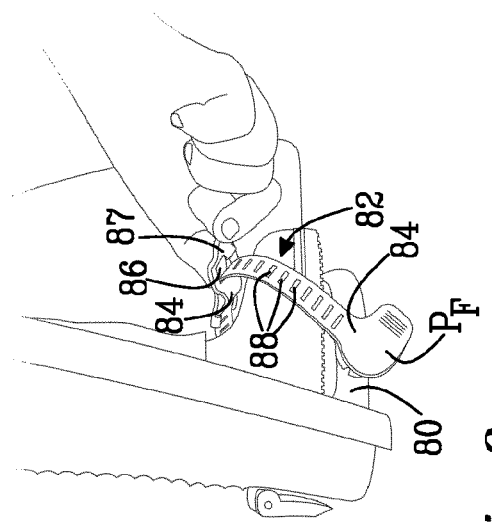

BICYCLE CHILD SEAT

TECHNICAL FIELD

The invention relates to a bicycle child seat comprising a seat module which can be displaced between an upraised position and a rest position. The bicycle child seat further comprises an attachment module adapted to be attached to the bicycle. The seat module is pivotable with respect to the attachment module.

BACKGROUND

Bicycle child seats, sometimes referred to as bicycle baby-seats, are usually mounted to the rear of a bicycle to permit transportation of a child on the bicycle in a safe manner. A bicycle child seat generally comprises a seat module comprising a seat section, a back rest section and a leg rest section. Each section is usually anatomically shaped to provide a comfortable position for the child during transportation. Safety straps, also referred to as safety belts, are used to retain the child to the bicycle child seat.

Some bicycle child seats are adapted to accommodate a sleeping child, and especially sleeping babies. To permit a child to fall asleep easier, and to stay asleep, the seat module can be pivotably attached to an attachment module, which in turn is mounted to the bicycle. The seat module can thus be pivotable between an upraised position, in which the child sits in an orderly fashion, and a rest position, in which the child can sleep substantially in a horizontal position, or at least sit in a slightly more angled position.

A pivotable bicycle baby-seat is disclosed in the European patent application No. EP 0,832,811 A1, STAMP S.r.l. The bicycle baby-seat comprises a seat and a back rest, the bicycle baby-seat also comprises attachment means to attach the bicycle baby-seat to the bicycle. The seat and back rest can be pivoted between an upraised position and a rest position using an adjustable support arrangement having a frame like structure and extendable pistons. The back rest is pivotally connected to the adjustable support arrangement substantially at the center of the back rest, and thus pivots substantially about the center of the back rest between the upraised position and the rest position. When displacing the bicycle baby-seat between the upraised position and the rest position, the center of gravity is displaced in a horizontal direction and in a vertical direction.

In another embodiment, the seat and the back rest is pivotally connected to the top of the back rest, i.e. substantially at the uppermost edge of the back rest, and thus pivot substantially about the top of the back rest between the upraised position and the rest position. Similar to the earlier embodiment, when displacing the bicycle baby-seat between the upraised position and the rest position, the center of gravity is displaced in a horizontal direction and in a vertical direction.

In yet another embodiment, the seat of the bicycle baby-seat is slidably connected to the adjustable support arrangement. The seat and the back rest slip between the upraised position and the rest position along an arc shaped curvature. Similar to the earlier embodiments, when sliding the bicycle baby-seat between the upraised position and the rest position, the center of gravity is displaced in a horizontal direction and in a vertical direction. Further, sliding mechanisms tends to rely on low friction between the sliding surfaces which in practice has been found to be difficult to achieve without using expensive materials or wheel-based solutions.

The mentioned solutions are said to keep the center of gravity substantially unchanged when displacing the seat and the back rest between the upraised position and the rest position. However it is obvious that this is not the case.

It can thus be understood that there are some drawbacks of the known prior art. The disclosed solutions displace the center of gravity in both a horizontal direction and a vertical direction when displacing the seat and the back rest between the upraised position and the rest position. This implies that the user has to move or to some extent even lift the weight of the child when displacing the seat and the back rest. It also implies that when a user unlocks the seat module to displace it there is a risk that the seat module is accidentally displaced if the user is not ready to receive or retain the seat module in position.

In yet another embodiment disclosed in EP 0,832,811 A1, the back rest is pivotable with respect to the seat itself. Such solutions are however inferior compared to solutions in which the whole seat module is displaced as one unitary piece. When displacing a back rest with respect to the seat, a child is positioned in a substantially laid down posture. When displacing both the seat and the back rest, the child will take a more favorable posture of an angled sitting position. Sitting in an angled position, the seat itself is assisting the passenger, i.e. the child, during a fast retardation.

SUMMARY

It is an object of the present invention to provide a solution to at least parts of the mentioned drawbacks, to reduce the drawbacks or at least to provide for a useful alternative to the mentioned prior art. The object is at least partly met by a bicycle child seat adapted to be mounted to a bicycle. The bicycle child seat comprises a seat module comprising a seat section and a back rest section. The bicycle child seat also comprises an attachment module adapted to be mounted to the bicycle. The seat module is pivotally arranged to the attachment module so that the seat module can pivot between a rest position and an upraised position with respect to the attachment module. At least a portion of the seat module and/or the attachment module comprises an arc portion. The seat module can pivot along the arc portion with respect to the attachment module.

The pivot motion could be compared and described as a rocking-chair motion, or that the seat module can pivot along the arc portion with respect to the attachment module in a rocking-chair manner. In other words, the seat module rolls on the receiving surface of the attachment module. When rolling, the pivot axis about which the seat module pivots is displaced along the arc portion. The angle between the arc portion and the arc portion receiving surface of the corresponding module is changed as the seat module pivots along the arc portion. The seat module is configured to pivot along the arc portion with respect to the attachment module in a non-sliding manner.

The present invention provides for a bicycle child seat which has a simple and compact mechanism for pivoting the seat module. When displacing the seat module in a rocking chair manner, the center of gravity of the bicycle child seat and a child positioned in the bicycle child seat is not severely affected but substantially only moved along a horizontal path. A user tilting the seat module does not need to lift, or raise the center of gravity, and further not carry the weight of the bicycle child seat or the child during such displacement.

According to an aspect, the arc portion of the seat module and/or the attachment module is a circular arc portion. The shape of the arc portion can vary of it is preferable that the arc portion is a circular arc portion. Using a circular arc portion enables the substantially all the weight of the bicycle child seat and the weight of the child to impart a force component along a radius of the circular arc portion. The center of gravity is in this embodiment moved along a substantially straight horizontal path as the seat module is displaced between the rest position and the upraised position with respect to the attachment module.

According to an aspect the seat module comprises the arc portion and the attachment module comprises an arc receiving portion. The arc receiving portion has a substantially flat form. Having an attachment module comprising an arc receiving portion having a substantially flat form enables the attachment module to have a slim compact design. This is important as there is much to gain by keeping the center of gravity as low as possible with respect to the ground, i.e. the vertical height and the Z-axis. The rocking property of the seat module is still maintained.

According to an aspect, at least one of the arc portion of the seat module and/or the arc receiving portion of the attachment module comprises anti-slip members, or anti-slip means. The anti-slip member(s), or anti-slip means, is adapted to prevent the seat module from being displaced in any other fashion than the actual tilting about the arc portion and especially from sliding or slipping on a surface of the attachment module.

According to an aspect, the anti-slip members, or anti-slip means, are formed by a corrugated surface, protrusions, apertures and/or indents, it is advantageous if the arc portion of the seat module comprises a corrugated surface which is positioned on the arc portion to interact with a corresponding corrugated surface of the arc receiving portion of the attachment module. The corrugated surfaces can be formed by protrusions, and a corresponding corrugated surface could be formed by indents or apertures for example, which cooperate by meshing with each other when used.

According to an aspect, the arc portion of the seat module is formed by a plurality of raised ridges. The number of raised ridges can be one or more, two or more, three or more, or at least four raised ridges. Having a plurality of raised ridges is an easy way of manufacture the arc portion, especially if the arc portion is arranged on a separate part with respect to the seat section, i.e, on a first connection piece.

According to an aspect, at least one, preferably two, of the raised ridges of the arc portion comprises anti-slip members, or anti slip means.

According to an aspect, the seat section, back rest section and the leg rest section are integrally formed in one unitary piece of material. This can be achieved by form molding the sections on one unitary piece of material. Optionally each section can be fixedly secured to each other permitting a simultaneous pivotable motion of the sections between the rest position and the upraised position.

According to an aspect, the seat module further comprises a leg rest section.

According to an aspect, the bicycle child seat comprises a lock mechanism to lock the position of the seat module with respect to the attachment module, at least in the upraised position and the rest position. The lock mechanism can also be used to lock the position of the seat module with respect to the attachment module in a positioned between the upraised position and the rest position. The lock can be arranged to automatically engage the seat module, e.g. by biasing a lock pin into engagement, so that the rocking of the seat module is performed in a step wise manner.

According to an aspect, the seat module is connected to the attachment module via a pivot connection. The pivot connection is configured to permit the seat module to pivot along the arc portion so that the seat module can be displaced in a rocking chair manner with respect to the attachment module. The displacement can be continuous or stepwise.

According to an aspect, the pivot connection comprises a biasing member such as a helical spring, biasing the seat module and the attachment module towards each other. By biasing the seat module and the attachment module together, rattle and play can be significantly limited or completely removed. The biasing member also assists to provide a controlled pivoting when displacing the seat module with respect to the attachment module.

The pivot connection can comprises at least one screw cooperating with the biasing member, the screw being pivotally connected to the seat module, e.g. via a transversely extending bar adapted to rotate slightly during displacement of the seat module.

According to an aspect of the invention, the bicycle child seat comprises a seat module pivotally arranged to an attachment module so that the seat module can pivot between a rest position and an upraised position with respect to the attachment module. The seat module is configured to pivot along an arc portion with respect to the attachment module in a rocking-chair manner; The pivot in done with a step wise motion or with a continuous motion.

According to an invention, the leg rest section of a bicycle child seat comprising a foot pad having a foot rest surface. Each foot pad is provided with a foot strap. The foot strap comprises at least one pivotable strap member adapted to pivot between a first position in which the at least one strap member extends across the foot rest surface of the foot pad, and a second position, in which the at least one foot strap is arranged in a non-operable position substantially parallel with the foot rest surface of the foot pad.

The foot strap can be formed by a first and second strap member adapted to be connected together at an appropriate size. The first strap member can be provided with an aperture adapted to receive the second strap member and optionally further comprise a plurality of lock apertures adapted to cooperate with a lock flange of the first strap member.

BRIEF DESCRIPTION OF THE DRAWINGS

Nonlimiting embodiments of the present invention will be described with reference to the accompanying figures in which;

FIG. 8a-8c show how the foot strap is tightened about the child's foot by an adult using only one hand.

DETAILED DESCRIPTION OF PREFERRED EMBODIMENTS

Figure 1A:
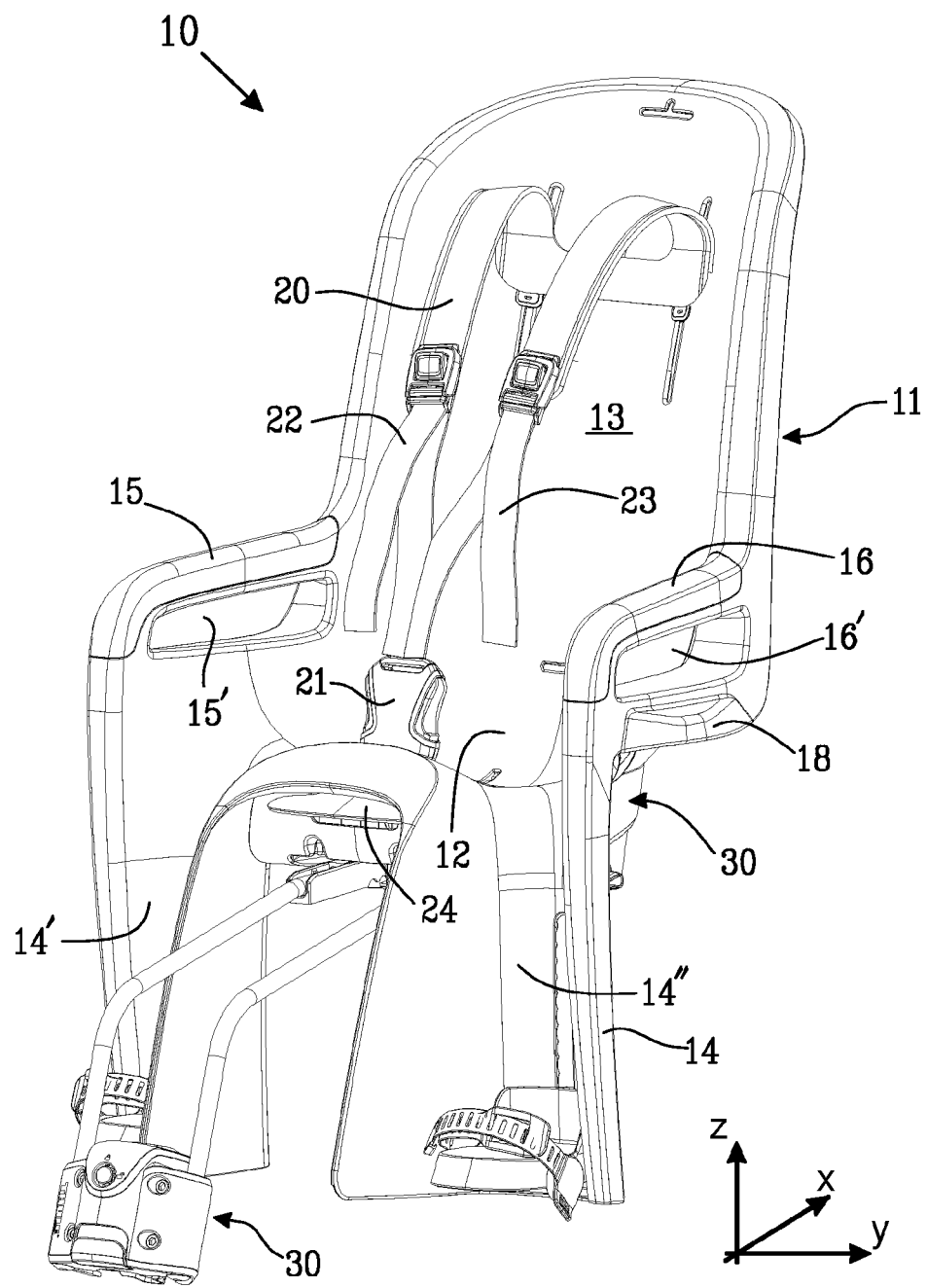
FIG. 1a shows a bicycle child seat ready to be mounted to a bicycle, the bicycle child seat comprises a seat module and an attachment module.

FIG. 1a shows a bicycle child seat 10 adapted to mounted to a bicycle. The bicycle child seat 10 is adapted to safely carry a child during transportation with the bicycle, and enables the child to be strapped to the bicycle child seat 10 permitting the bicycle to accelerate and retardate in a normal manner without jeopardizing the safety of the child. The bicycle child seat 10 can of course be mounted to other vessels or vehicles but its primary purpose is to permit safe transportation of children on bicycles.

Figure 1B:
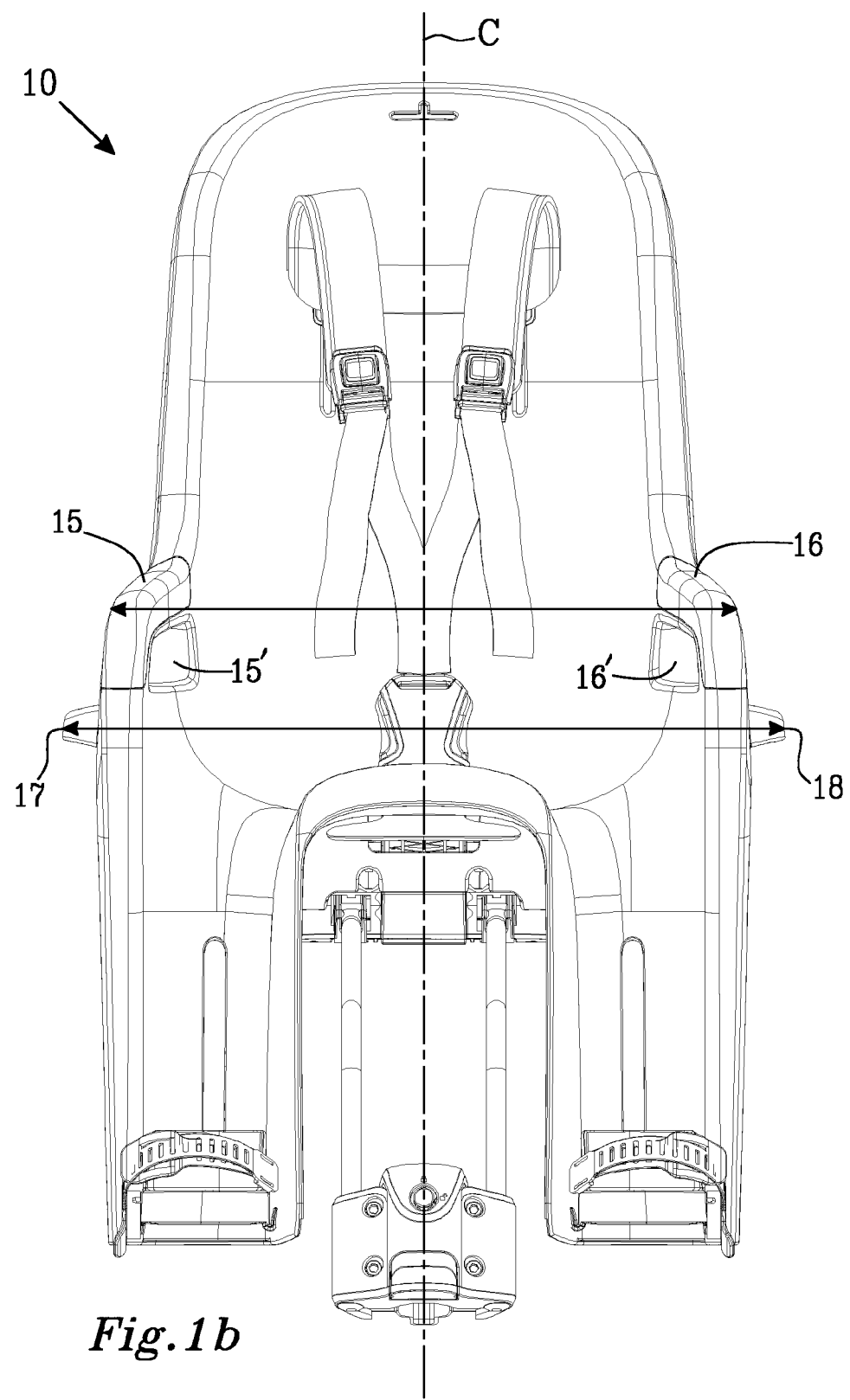
FIG. 1b shows the bicycle child seat of FIG. 1a ready to be mounted to a bicycle with a view towards the front.
Figure 2A:
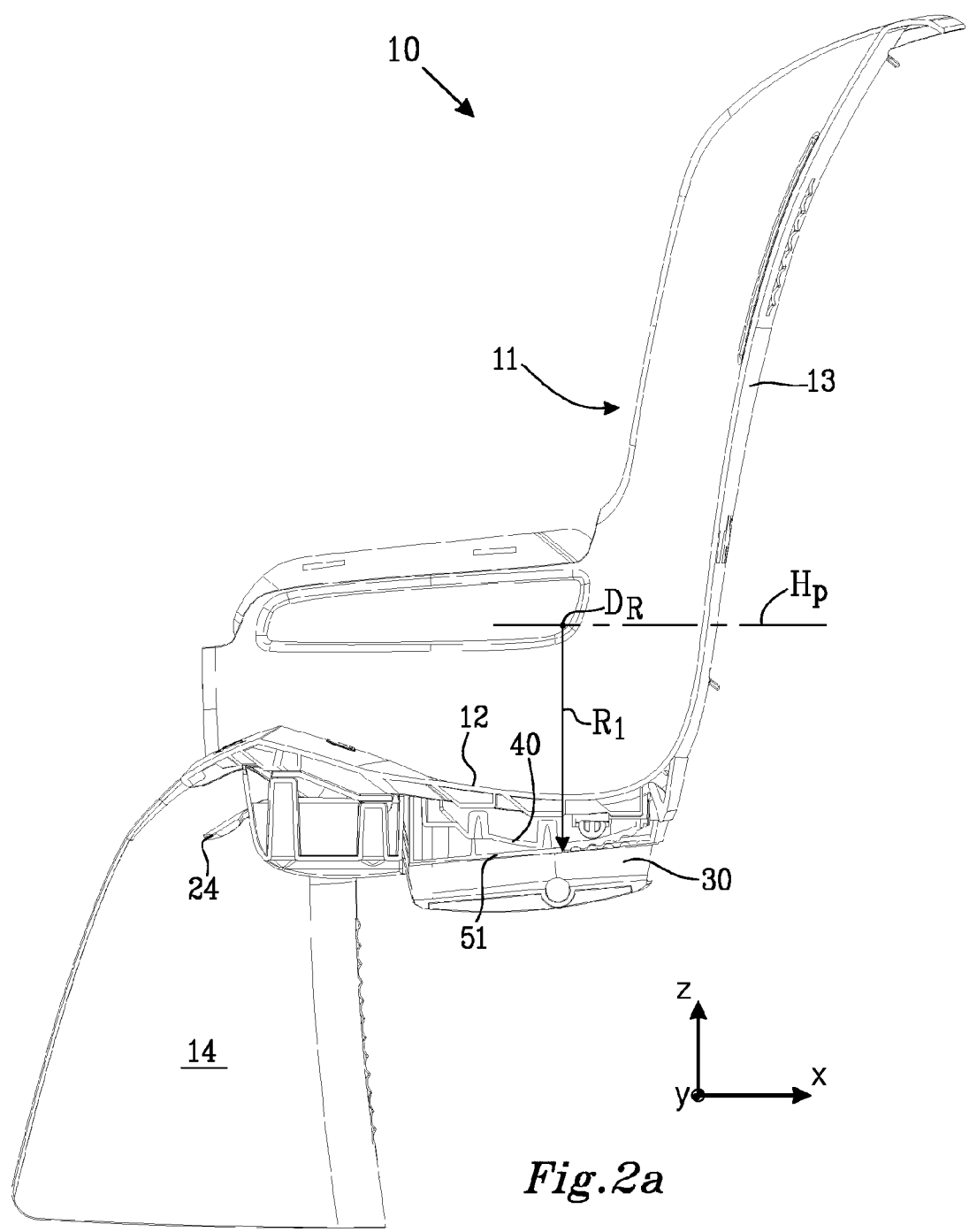
FIG. 2a shows a cross section of the bicycle child seat of FIG. 1a with the seat module in the upraised position.

For the purpose of orientation, the length of the bicycle child seat 10 extends along an X-axis, the width of the bicycle child seat 10 extends along an Y-axis, and the height of the bicycle child seat 10 extends along an Z-axis, as shown in FIGS. 1 and 2a.

The bicycle child seat 10 comprises a seat module 11. The seat module 11 in FIG. 1a comprises a seat section 12, a back rest section 13, and a leg rest section 14. In the shown embodiment, the seat section 12, the back rest section 13, and the leg rest section 14 are formed in one unitary piece of material, e.g. by form molding, but can also be formed by individual pieces attached together. Advantageously, the three mentioned sections are fixedly secured to each other independently of whether they are formed in one unitary piece of material or by separate pieces.

The seat module 11 can be provided with cushions, such as a seat cushion or a back rest cushion to provide a more comfortable ride for the child. Other arrangements, materials, trims or apparels are of course possible to attach to the seat module 11. The seat module 11 can comprise a safety belt arrangement 20 to secure the child to the seat module 11 during transportation. The safety belt arrangement 20 is of a three point type comprising a buckle 21 arranged to be positioned between the child's legs and adapted to cooperate with two axle straps 22, 23 configured to extend across the shoulders and on each side of the child's head during use.

The bicycle child seat 10 further comprises an attachment module 30. The attachment module 30 is configured to permit the seat module to be attached to the object of transportation, preferably a bicycle. In this case, the attachment module 30 is adapted to be secured to parts of a frame of a bicycle and optionally to a load carrier of a bicycle using a bicycle attachment arrangement, in this embodiment partly formed by rods and connection devices.

The seat module 11 and the attachment module 30 are displaceble with respect to each other, permitting the seat module 11 to tilt between a rest position and an upraised position. Instead of sliding as some of the prior art, the seat module rolls on the attachment module 30. The upraised position is generally used when the child is awake, while the rest position is generally used when the child is sleeping, or ready to fall asleep. In the rest position, the back rest section 13 is more horizontal than in the upraised position, while the seat section 12 tends to be more vertically angled as compared with the upraised position. As will be understood, the whole seat module 12 is tilted during displacement, i.e. both the seat section 12 and the back rest section 13 are tilted together and simultaneously.

Figure 2B:
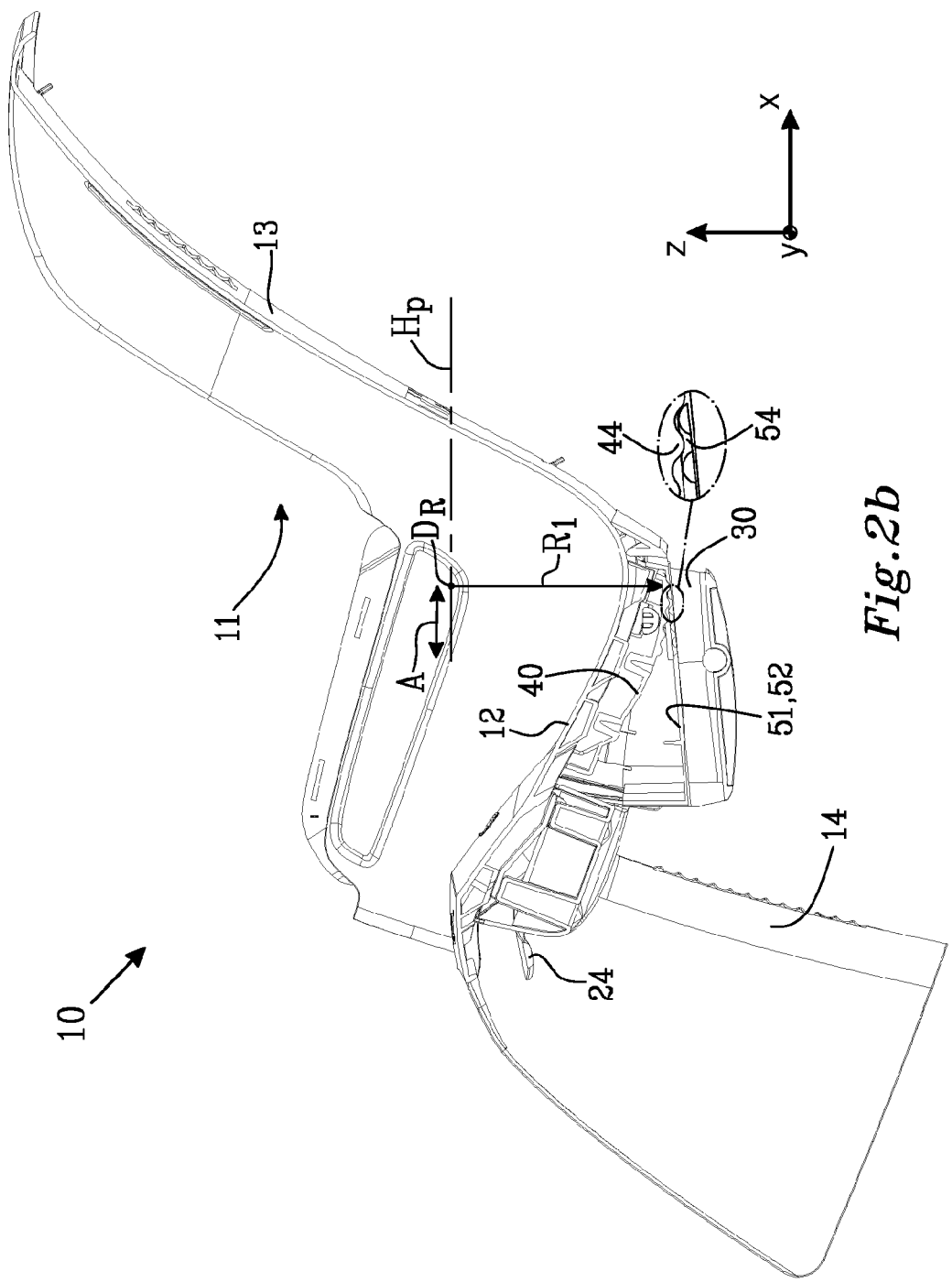
FIG. 2b shows a cross section of the bicycle child seat of FIG. 1a with the seat module in the rest position.

As is noticed, the leg rest section is formed by a first and a second leg rest portion 14', 14". A release handle 24, indicated in FIGS. 1 and 2a-2b, is arranged in the proximity of the seat section 12 and between each leg rest portion 14', 14" of the leg rest section 14. The release handle 24 is adapted to lock or unlock the seat module 11 with respect to the attachment module 30 to permit the seat module 11 to pivot with respect to the attachment module 30 in a rocking-chair manner. The release handle 24 and the cooperating lock mechanism can be adapted to release and lock the seat module 11 step wise, i.e. so that the pivoting of the seat module 11 is performed in a step-wise manner. A user would in this case be required to push the release handle 24 between each step as the seat module 11 pivots. Optionally the lock mechanism can be adapted to permit a continuously pivot motion of the seat module 11 with respect to the attachment module 30 until it locks the seat module 11 from displacement. The lock mechanism could be a simple spring loaded lock pin for example. Due to the release handles position, a user pivoting the seat module can grasp the release handle 24 and hold the other hand about the back rest section 13 thus having a very favorable position when pivoting the seat module 11 as the user will have good control of the pivot motion.

FIG. 1b shows the bicycle child seat 10 with a view towards the front. As can be noted, the bicycle child seat 10 comprises a first and a second handle 15, 16, defined by a first and a second aperture 15', 16'. Associated with each handle is a hand guard 17, 18, also referred to as handle safety flanges. The hand guards 17, 18 are adapted to protect the child's hands during transportation and as the hands rests on the first and the second handle 15, 16. For example if the driver of the bicycle passes very close to a wall or a three or similar obstructing object, there is a risk that the child's hand is chafed against that object. To protect the hands, the hand guards 17, 18 extends further out from the center line C of the bicycle child seat 10, than the first and the second handle 15, 16, as indicated by the arrows in FIG. 1b. Turning back to FIG. 1a, an important aspect is that each side of the bicycle child seat 10 and each handle 15, 16 are associated with a hand guard. The exact shape and form of the hand guard can vary. As is noticed in FIG. 1a, the hand guard 18 has a curved form protruding from the seat section below the handle, in this case the second handle 16 is shown, and the second aperture 16'. The hand guards 18 extend substantially parallel with the seat section forming a protective flange below the second aperture 16'. The first and the second hand guard 17, 18 are advantageously formed in one unitary piece of material with the seat section 12, the back rest section 13, and optionally the leg rest section 14.

FIGS. 2a-2b shows a cross section of the bicycle child seat 10 of FIG. 1a in which; FIG. 2a shows the seat module 11 when positioned in the upraised position with respect to the attachment module 30 and; FIG. 2b shows the seat module 11 when positioned in the rest position with respect to the attachment module 30. FIGS. 2a-2b further shows the seat section 12, the back rest section 13 and the leg rest section 14.

As can be seen in FIG. 2a, the seat module 11 comprises an arc portion 40. The arc portion 40 can be described as being convex with respect to the seat section 12 of the seat module 11, with the apex of the arc portion pointing away from the seat section 12 of the seat module 11 and towards the attachment module 30. The arc portion 40 of the seat module 11 can also be described as parts of the circumference of a circle formed portion of the seat module 11. In the shown embodiment more specifically referred to as a circular arc portion. The arc portion 40 could however be an arc portion having some other curved shape, such as parts of an elliptic form. The arc portion 40 can be integrally formed by a portion of the seat section 12 of the seat module 11, or be attached thereto as a separate piece of material as will be described below. The seat module 11 rolls on the receiving surface of the attachment module 30. When rolling, the pivot axis about which the seat module 11 pivots is displaced along the arc portion 40. The angle between the arc portion 40 and the arc portion receiving surface of the corresponding module is changed as the seat module 11 pivots along the arc portion 40. The seat module 11 is configured to pivot along the arc portion 40 with respect to the attachment module 30 in a non-sliding manner. In this way, the seat module 11 and the attachment module 30 always contact each other on the same spot as the seat module 11 rolls, or rocks, with respect to the attachment module 30.

The arc portion 40 of the seat module 11 is positioned underneath the seat section 12 of the seat module 11. The arc portion 40 of the seat module 11 is as mentioned a circular arc portion and extends substantially along a curvature with a radius R1 and an origin $O_R$ positioned above the seat section 12 of the seat module 11 and in front of the back rest portion 13 of the seat module 11. The origin $O_R$ is shown FIG. 2a. The radius R1 can be between from 5-25 cm, preferably from 7-20 cm, more preferably from 10-20 cm.

By positioning the arc portion 40 underneath the seat section 12 of the seat module 11, and by having a suitably formed arc portion, the center of gravity of the seat module 11 and a child positioned in the seat module 11, is not severely affected by when tilting between the rest position and the upraised position. In fact, the center of gravity is substantially only moved along in a horizontal plane, in FIGS. 2a-2b a plane substantially parallel with the X-axis and indicated with Hp in FIGS. 2a-2b and with the arrow A in FIG. 2b.

The attachment module 30 comprises an arc receiving portion 51 adapted to cooperate with, and be positioned directly adjacent to, the arc portion 40 of the seat module 11. The arc receiving portion 51 of the attachment module 30 can be integrally formed with the attachment module 11, or be attached thereto as a separate piece of material as will be described below.

As mentioned, the seat module 11 can be displaced with respect to the attachment module 30 between an upraised position and a rest position. FIG. 2b shows the seat module 11 after being pivoted along the arc portion 40 of the seat module 11 to the rest position. As is noticed, the arc portion 40 of the seat module 11 has been used to "rock" the seat module 11 with respect to the attachment module 30. The rocking-chair motion will be described more clearly below. The displacement of the center of gravity is imparting the seat module 11 only with a low force component which acts to tilt the seat module 11. A user does not need to lift or carry parts of the weight of the child or the bicycle child seat itself as compared with some prior art solutions.

The arc portion 40 of the seat module 11 is positioned directly adjacent the arc receiving portion 51 of the attachment module forming a pivot interface there between. At least one of the arc portion 40 of the seat module 11 or the arc receiving portion 51 of the attachment module 30 comprises an arc, optionally both. In the shown embodiment, the seat module 11 comprises the arc portion. A pivot axis P is positioned at the pivot interface. When the seat module 11 is displaced with respect to the attachment module 30 between the rest position and the upraised position, the pivot axis P is moved along the pivot interface. The distance the pivot axis P is displaced along the pivot interface is a function of the radius R1, i.e. the curvature of the arc portion 40 and of course the form of the arc receiving portion 51 of the attachment module 30. An arc portion having a larger radius will displace the pivot axis P a larger distance. In one embodiment, the pivot axis P can be displaced a distance from 1-10 cm, preferably 1-6 cm, more preferably 2-4 cm.

In the shown embodiment, the arc receiving portion 51 of the attachment module 30 is formed by a substantially flat area 52 on which the arc portion 40 of the seat module 11 "rolls" a limited distance. There is thus no sliding displacement between the seat module 11 and the attachment module 30. To improve the "non sliding" properties, the arc portion 40 of the seat module 11 can be provided with at least one anti slide member, or anti slide means. In the shown embodiment, the arc portion 40 of the seat module 11 comprises a corrugated surface formed by protrusions 44, forming a wave like pattern of protruding members when seen in cross section as in FIG. 2b. The arc receiving portion 51 of the attachment module 30 comprises corresponding indents 54, in some embodiments optionally or additionally apertures or combinations of indents and apertures. The shape and form of the protrusions 44 and the indents 54 may vary. For example, the arc portion 40 of the seat module 11 can be provided with square like protrusions which cooperates with square like indents or apertures.

Figure 3:
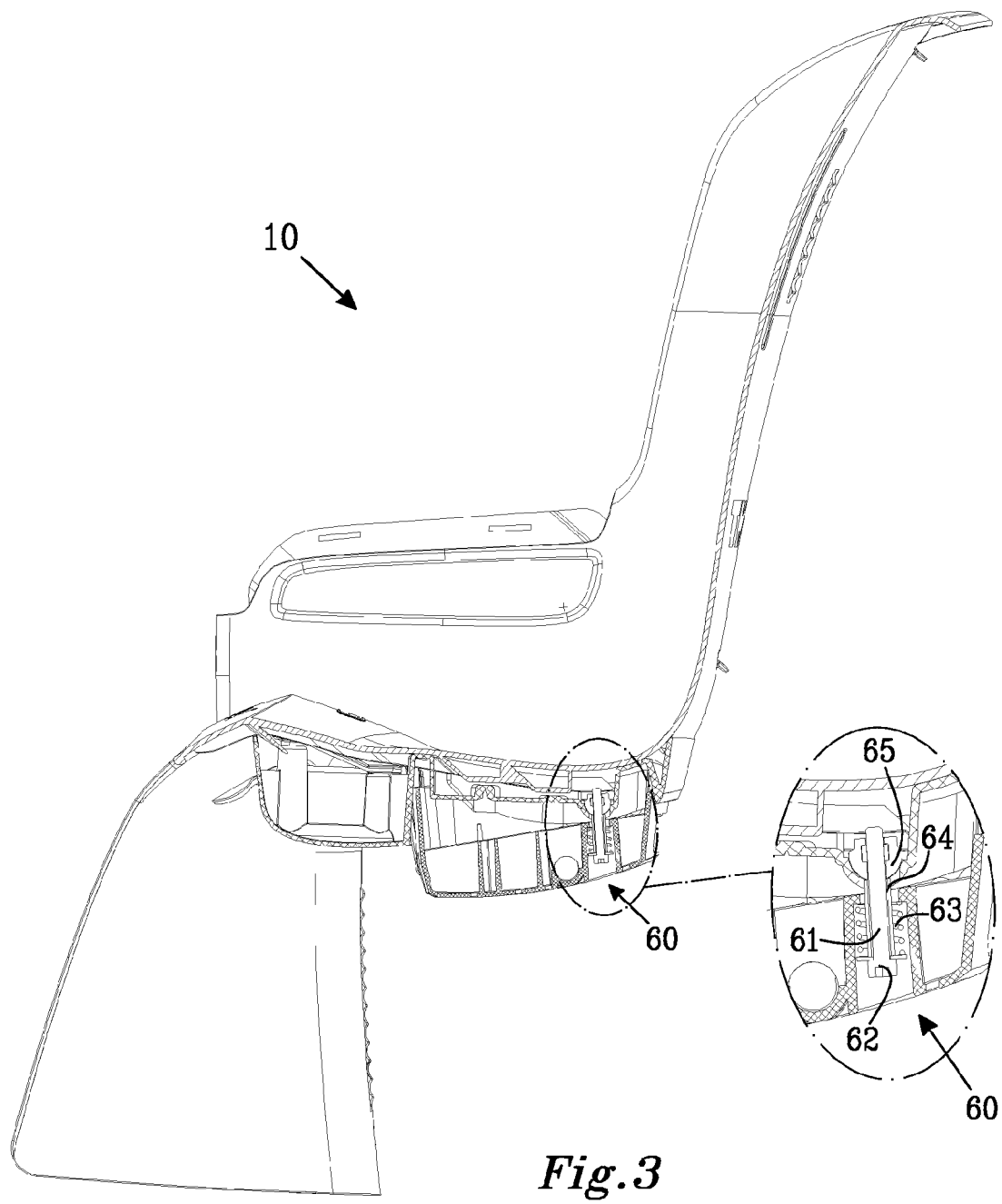
FIG. 3 shows a cross section of the bicycle child seat of FIG. 1a and a pivot connection connecting the seat module with the attachment module in greater detail.

The seat module 11 is attached to the attachment module 30 with a pivot connection 60 which permits the seat module 11 to pivot along the arc portion 40 of the seat module 11 with respect to the attachment module 30. FIG. 3 shows an embodiment of such a pivot connection.

FIG. 3 shows the pivot connection 60 comprising a screw 61 with a head 62. The screw 61 extends between the upper side of the attachment module 30 and to the opposing under side of the seat module 11, as can be seen in FIG. 3. A helical spring 63 is positioned between the head 62 of the screw 61 and rests against a surface of the attachment module 30. The spring 63 act to force the screw 61 in a direction away from the attachment module 30 and the seat module 11. The screw 61 extends through an aperture 64 in the attachment module 30 and is attached to the seat module 11, and more specifically to a rod 65 which extends along the width of the seat module, i.e. along the Y-axis and perpendicular to the X- and Z-axis. The rod 65 can rotate slightly about its longitudinal centre axis so that the screw 61 can tilt somewhat as the seat module 11 is displaced between the rest position and the upraised position. The aperture 64 thus has a diameter which is larger than the diameter than the screw 61, large enough to permit the screw 61 to tilt slightly. The at least one screw 61 further extends across the pivot interface formed between the arc portion 40 of the seat module 11 and the arc receiving portion 51 of the attachment module 30, or at least through an imaginary plane formed by the pivot interface.

As mentioned, the spring 63 forces the screw 61 in a direction away from the attachment module 30 and the seat module 11. As the screw 61 is attached to the rod 65, the seat module 11 is biased against the attachment module 30. The arc portion 40 of the seat module 11 is thus biased into contact with the arc receiving portion 51 of the attachment module 30. The pivot connection 60 substantially removes, or at least reduces, any play between the seat module 11 and the attachment module 30. The pivot connection 60 can in an embodiment be a biased pivot connection adapted to bias the seat module and the attachment module towards each other. If the rigidity of the pivot connection 60 is to be increased, two or more screws can be used as described above, each arranged with a spring. The spring force of the spring of the can also be varied of course. If a stronger more rigid pivot connection is desired, springs of the one or more springs with a higher spring force can be selected.

Figure 4A:
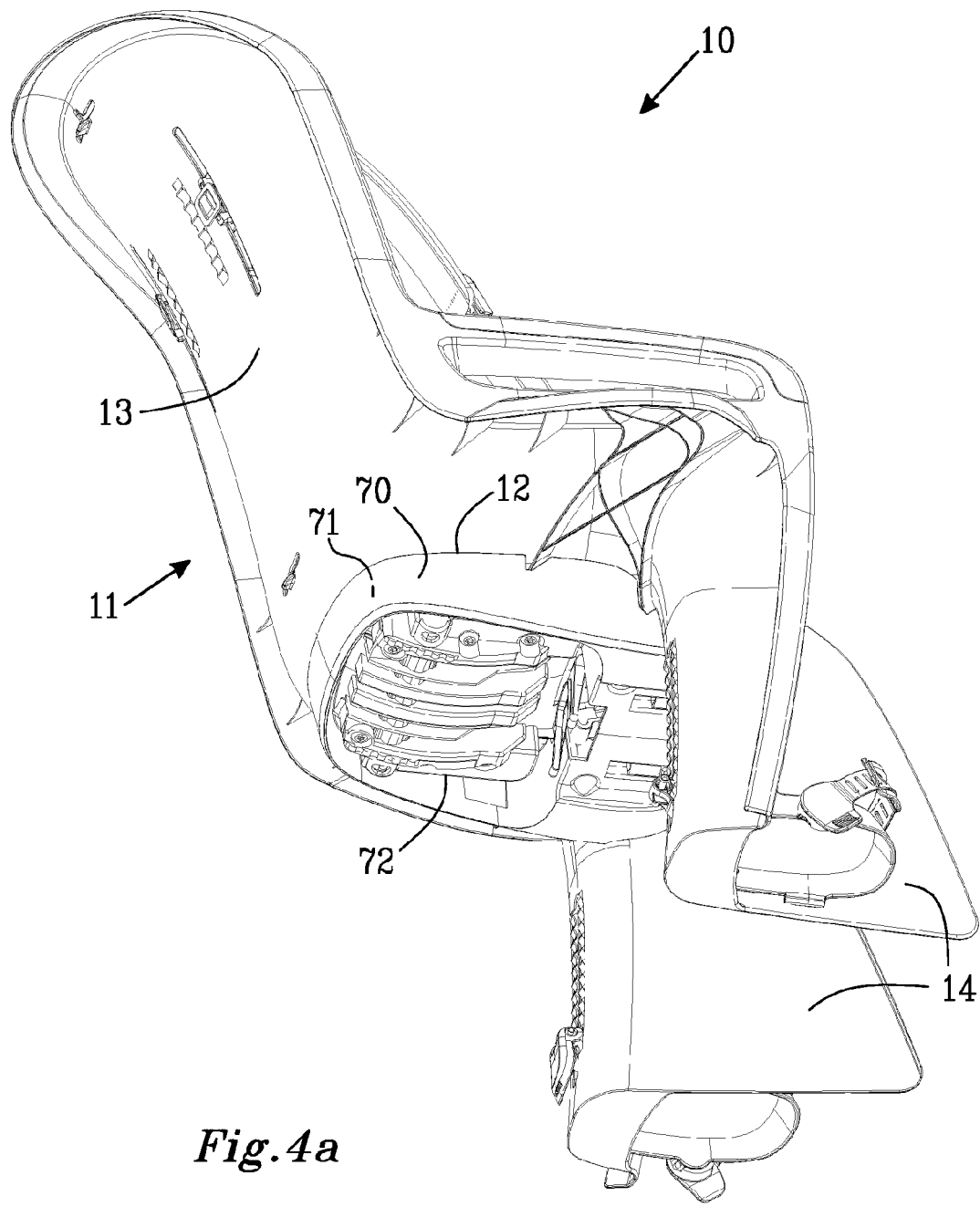
FIG. 4a shows the seat module 11 with a view towards the under-side of the seat module 11 and the under-side of the first connection piece comprising an arc portion.

The arc portion 40 of the seat module 11 will be described in greater detail with reference to FIGS. 4a and 4b. FIG. 48 shows the seat module 11 seen in perspective with a view towards the underside of the seat module 11. The seat section 12, the back rest section and the leg rest section 14, are form moulded in a thermoplastic polymer material such as polypropylene polyethylene or mixtures thereof. Connected to the underside of the seat section 12 is a first connection piece 70. The first connection piece 70 comprises a first and a second side 71, 72. The first side 71 of the first connection piece 70 is adapted to snugly fit against the underside of the seat section 12 while the second side 72 is adapted to cooperate with the attachment module 30. The first connection piece 70 can be form moulded using a thermoplastic polymer material such as polypropylene, polyethylene or mixtures thereof.

Figure 4B:
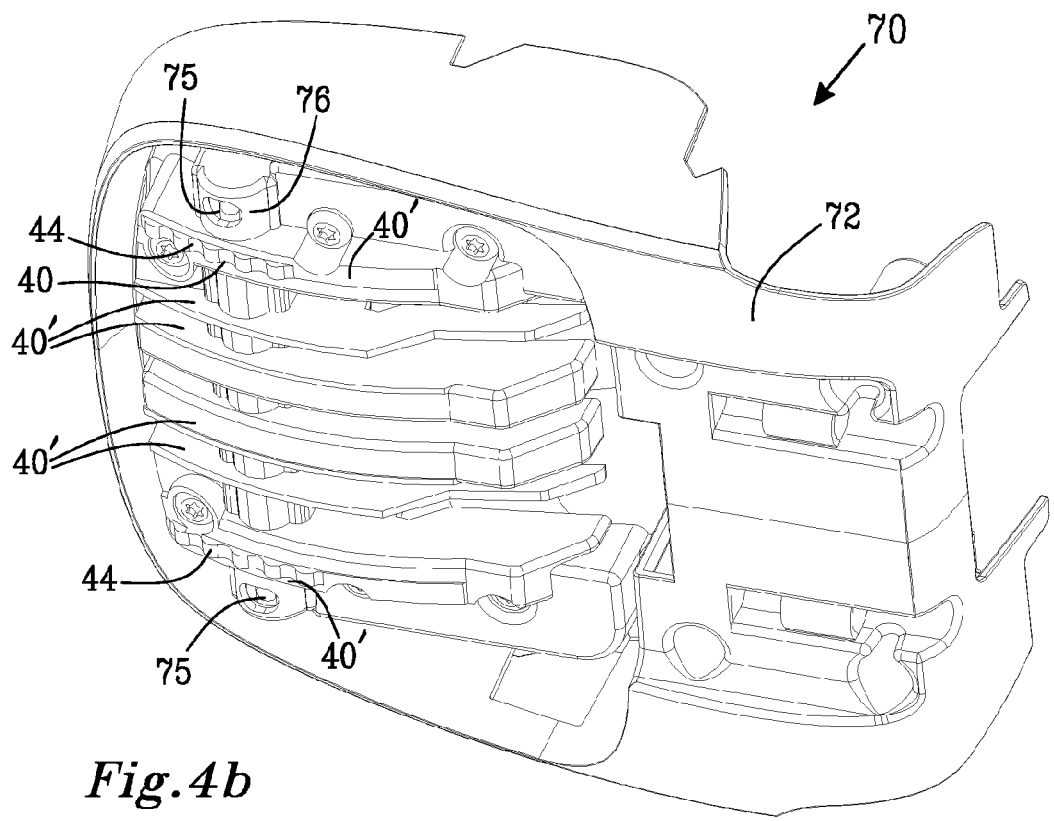
FIG. 4b the first connection piece in greater detail with a view towards the arc portion of the first connection piece.

FIG. 4b shows the second side 72 of the first connection piece 70 in greater detail. The arc portion 40 is arranged on the second side 72 of the first connection piece 70. In the shown embodiment, the arc portion 40 is formed by a portion of the first connection piece 70. The form and shape of the arc portion 40 may vary dependent on the desired properties of the arc portion. In the shown embodiment, the arc portion 40 of the first connection piece 70 is formed by a plurality or raised ridges 40' running in a length wise direction of the bicycle child seat, i.e. along the length of the bicycle child seat 10 and the X-axis. The first connection piece 70 comprises six raised ridges 40' each adapted to be positioned adjacent the arc receiving portion 51 of the attachment module 30. The number of raised ridges can be from 1-20, preferably 1-10. In case of only one raised ridge, the ridge should be wide enough to still permit the seat module 11 to tilt in a stable manner. The at least one raised ridge 40 can also be structurally supported by a portion of the arc receiving portion of the attachment module 30. As is further noticed, two of the raised ridges 40' comprises the anti slide member, or anti slide means as mentioned above. The outermost raised ridges 40' each comprises the corrugated surface formed by protrusions 44. In other embodiments one or more of the raised ridges comprises the anti slide member, or anti slide means, e.g. in the form of a corrugated surface, e.g. formed by protrusions such as the protrusions 44.

As is noticed in FIG. 4b, the arc curvature formed by the radius R1 of the arc portion 40 does not extend along the full length of the raised ridges 40. It is suitable if the arc curvature extends from 60-100%, preferably 80-100% of the length of the raised ridges 40'.

The first connection piece 70 comprises two holes 75 through which the screw 61 can extend. A groove 7 extends along the width of the connection piece 70, i.e. along the Y-axis perpendicular to the extension of the raised ridges 40, to accommodate the bolt 64 mentioned above. The rod 65 is thus arranged between the connection piece 70 and under side of the seat section 12.

Figure 5:
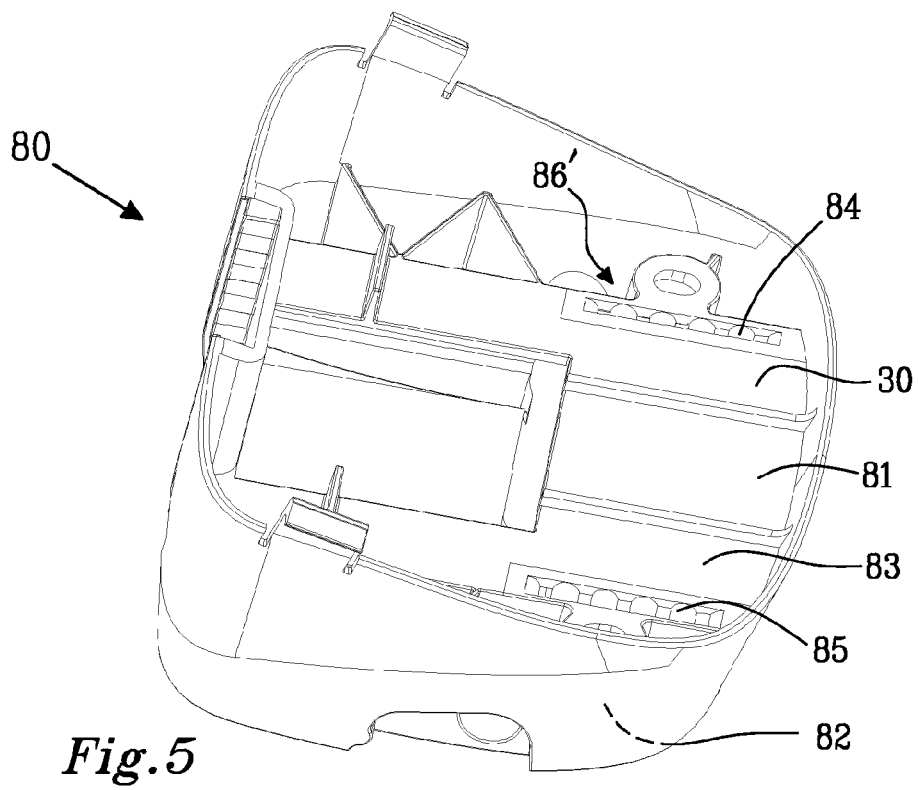
FIG. 5 shows the second connection piece and the arc receiving portion of the second connection piece.

FIG. 5 shows a second connection piece 80 comprising the arc receiving portion 51. As mentioned, the first connection piece 70 (not shown in FIG. 5) is adapted to cooperate with the arc receiving portion 51 of the attachment module 30 and thus the second connection piece 80. The second connection piece 80 comprises a first and a second side 81, 82. The first side 81 of the second connection piece 80 is adapted to be positioned facing towards the first connection piece 70 and the underside of the seat section 12 while the second side 82 is adapted to be connected to a bicycle attachment arrangement. The second connection piece 80 and the bicycle attachment arrangement together form the attachment module 30. The second connection piece 80 can be form moulded in a thermoplastic polymer material such as polypropylene, polyethylene or mixtures thereof.

The first side 81 of the second connection piece 80 comprises a substantially flat area 83 forming the arc receiving portion 51, which is adapted to cooperate with the raised ridges 40' of the first connection piece 70. A first and a second groove 84, 85 formed by a plurality of indents 86' are adapted to cooperate with the protrusions 44 of the first connection piece 70 to provide the anti-slide function. The indents 88 can be said to form a corresponding corrugated surface to the protrusions 44 of the raised ridges 40' of the first connection piece 70. The grooves 84, 85 extend parallel and aligned with the raised ridges 40' comprising the protrusions 44, so that the corrugations of each part mesh in a gear like manner to prevent the seat module 11 from slipping, or sliding, with respect to the attachment module 30.

Figure 6:
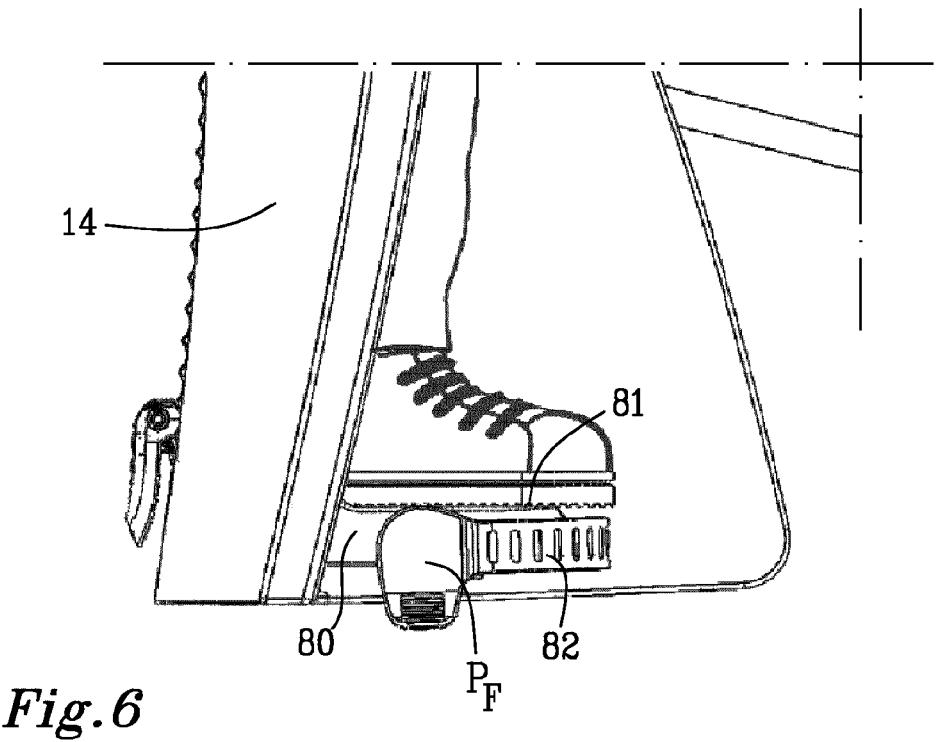
FIG. 6 shows the leg rest section of the bicycle child seat in greater detail, a foot pad comprising a foot strap in a non-operative position, a child's foot positioned on the foot rest surface of the foot pad.

FIG. 6 shows the leg rest section 14 of the bicycle child seat 10 in greater detail. The leg rest section 14 comprises a first and a second foot pad 80 each comprising a foot rest surface 81 adapted to permit a user to rest the feet when being sitting in the bicycle child seat 10. The foot pads 80 are displaceable in the vertical direction to accommodate children of different sizes. A foot strap 82 is adapted to retain the child's foot to the foot rest surface 80. Each of the first and a second foot rest surface 80 comprises a foot strap 82, although only one is described herein. The foot strap 82 can be displaced, or more accurately pivoted, between an operable position in which the foot strap 82 extends across the users foot, and a non-operable position in which the foot strap 82 extends substantially parallel with the foot rest surface 81 of the foot pad 80. The foot strap 82 is in FIG. 8 positioned in the non-operable position. As is notable, the foot strap 82 has a bow form to enable the foot strap 82 to extend across a child's foot when being in the operable position.

Figure 7:
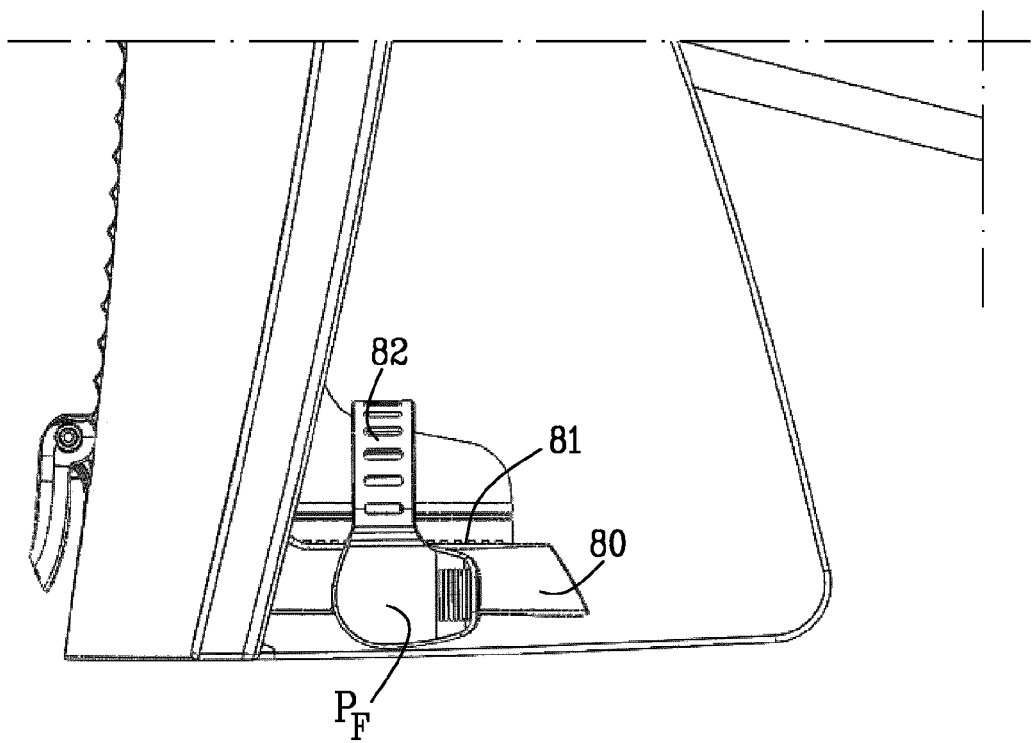
FIG. 7 the leg rest section of the bicycle child seat in greater detail, the foot pad comprising the foot strap is in an operative position.

FIG. 7 shows the foot pad 80 with the foot rest surface 81 and the foot strap 82 extending across the foot rest surface 81 while being in the operative position. The foot strap 82 pivots between the operative position and the non-operative position about a pivot point PF indicated in FIGS. 6 and 7.

FIGS. 8a-8c shows different stages of when the foot strap 82 is tightened about the child's foot by an adult. The foot strap 82 comprises a first and a second strap member 84, 85 adapted to be connected to each other to form the foot strap 82. The size of the bow form provided by the foot strap 82 is determined by the position at which the first and the second strap members 84, 85 are connected. The first strap member 84 comprises an aperture 86 through which the second strap member 85 extends. In the proximity of the aperture 86 is a lock flange 87 positioned adapted to cooperate with lock apertures 88 arranged on the first strap 84. Dependent on in which lock aperture 88 the lock flange 87 is inserted into, the size of the bow form of the foot strap 82 can be varied. The second strap member 85 comprises an aperture, or a grip member, adapted to grip about the first strap member 84 so as to retain a nice bow form on the foot strap 87.

The foot pad 80 has a substantially oblong form, a rectangular or foot shaped, with two opposing longitudinal sides and two opposing transverse sides. The first and the second strap members 84, 85 are attached to the opposing longitudinal sides of the foot pad 80, one on each side by means of a pivot connection.

An advantage of having two strap members 84, 85 which are adapted to cooperate as described above is that the adult only needs to use one hand when adapting the size of the foot strap 82. The foot strap 82 can also be pivoted from the shown operative position, to a non-operative position, as shown in FIG. 6, in which the bow form of the foot strap 82 is substantially parallel with the foot rest surface 81 of the foot pad 80. When being in the non-operative position, the foot strap 82 does not extend across the foot rest surface 81 of the foot pad 80.

The invention claimed is:

1. A bicycle child seat adapted to be mounted to a bicycle, said bicycle child seat comprising:
a seat module comprising a seat section and a back rest section; and
an attachment module adapted to be mounted to said bicycle,
said seat module being pivotally arranged to said attachment module so that said seat module pivots about a pivot axis between a rest position and an upraised position with respect to said attachment module,
at least a portion of said seat module or said attachment module comprising an arc portion,
wherein said seat module pivots along said arc portion with respect to said attachment module, and
wherein said pivot axis is positioned between said arc portion and an arc receiving portion disposed adjacent to said arc portion.

2. The bicycle child seat according to claim 1, wherein said arc portion of said seat module or said attachment module is a circular arc portion.

3. The bicycle child seat according to claim 1, wherein said seat module comprises said arc portion and said attachment module comprises said arc receiving portion, said arc receiving portion having a substantially flat form.

4. The bicycle child seat according to claim 3, wherein at least one of said arc portion of said seat module or said arc receiving portion of said attachment module comprises anti-slip members, or anti-slip means.

5. The bicycle child seat according to claim 4, wherein said anti-slip members, or anti-slip means, are formed by a corrugated surface, wherein said corrugated surface comprises at least one of protrusions, apertures, or indents.

6. The bicycle child seat according to claim 1, wherein said seat module comprises said arc portion, and wherein said arc portion is formed by a plurality of raised ridges.

7. The bicycle child seat according to claim 6, wherein at least one of said raised ridges of said arc portion of said seat module comprises anti-slip members, or anti-slip means.

8. The bicycle child seat according to claim 1, wherein said seat module further comprises a leg rest section.

9. The bicycle child seat according to claim 8, wherein said seat section, said back rest section and said leg rest section are integrally formed in one unitary piece of material, or fixedly secured together.

10. The bicycle child seat according to claim 1, wherein said bicycle child seat comprises a lock mechanism to lock the position of said seat module with respect to said attachment module, at least in said upraised position and said rest position.

11. The bicycle child seat according to claim 1, wherein said seat module is connected to said attachment module via a pivot connection.

12. The bicycle child seat according to claim 11, wherein said pivot connection comprises at least one biasing member, biasing said seat module and said attachment module towards each other.

13. The bicycle child seat according to claim 12, wherein said pivot connection comprises at least one screw, said at least one screw cooperating with said biasing member.

14. The bicycle child seat according to claim 13, wherein said screw is pivotally connected to said seat module.

15. The bicycle child seat according to claim 13, wherein said pivot connection comprises a spring disposed between said attachment module and a head of said at least one screw.

16. The bicycle child seat according to claim 1, wherein said seat module pivots along said arc portion with respect to said attachment module continuously or in a step-wise manner.

17. The bicycle child seat according to claim 1, wherein said seat module can pivot along said arc portion with respect to said attachment module in a non-sliding manner.

18. The bicycle child seat according to claim 1, wherein said seat module comprises said arc portion and said attachment module comprises said arc receiving portion, wherein said arc receiving portion comprises an arc.

19. A bicycle child seat adapted to be mounted to a bicycle, the bicycle child seat comprising:
a seat module comprising a seat section, a back rest section, and an arc portion;
an attachment module adapted to be mounted to the bicycle, the attachment module comprising an arc receiving portion; and
a pivot connection connecting the seat module to the attachment module,
wherein the seat module pivots about a pivot axis between a rest position and an upraised position with respect to the attachment module,
wherein the pivot axis is disposed between the arc portion and the arc receiving portion.

20. The bicycle child seat according to claim 19, wherein the pivot connection comprises at least one biasing member and at least one screw, wherein the biasing member biases the seat module and the attachment module towards each other and the at least one screw cooperates with the biasing member.

21. The bicycle child seat according to claim 20, wherein screw is pivotally connected to the seat module.

* * * * *